Figure 1:
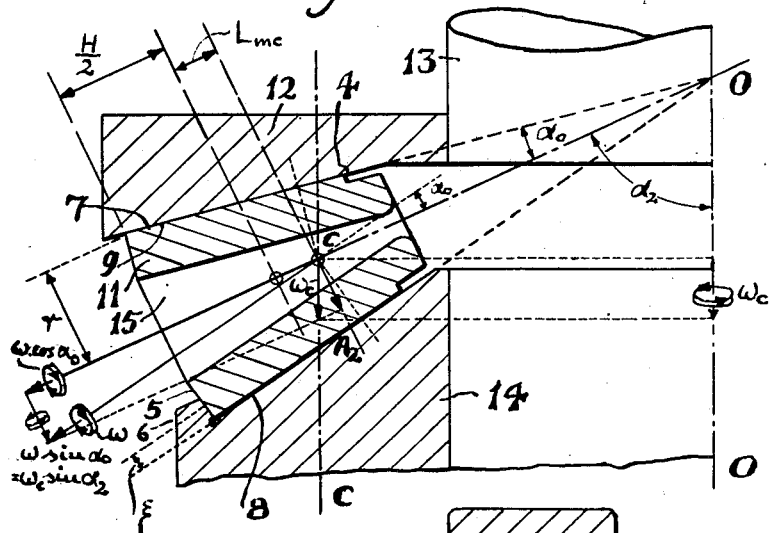

March 17, 1953   M. FRENKEL   2,631,904
TAPER ROLLER BEARING
Filed July 21, 1948   2 SHEETS—SHEET 1

Inventor.
Meyer Frenkel.
By

INVENTOR

Meyer Frenkel

Patented Mar. 17, 1953

2,631,904

UNITED STATES PATENT OFFICE 2,631,904

TAPER ROLLER BEARING

Meyer Frenkel, London, England

Application July 21, 1948, Serial No. 39,861
In Great Britain March 4, 1946

11 Claims. (Cl. 308—214)

This application is a continuation in part of my application Serial No. 732,025 filed March 3, 1947, now abandoned.

This invention relates to roller bearings adapted to carry axial load or radial load, or combinations of both kinds of loading, and, more particularly, to taper roller bearings.

The object of the invention will be understood from the following considerations:

I have proved in my paper "Ball and taper roller bearings," published in the "Journal of the Royal Aeronautical Society," London, England (No. 423, March 1946), that in present constructions of taper roller bearings the forces and couples acting on a roller in the operating bearing produce skewing of the roller between its tracks, with oscillations, including oscillating displacements of the roller in the direction of its geometric axis, entailing periodic impact of the roller against its tracks and against the retaining flange, the said phenomena increasing in severity with rising speed of rotation of the bearing, and being largely responsible for the fatigue-effects and generally rapid wear, which together impose the present known limits on the maximum speeds of operation and lengths of "life" of taper roller bearings, making these at present incapable of being used at high speeds.

I have proved that, in general, in a taper roller bearing without the main constructional provisions of the present invention described hereafter, that is the correct position of the centre of gravity of each bearing roller relative to its conical rolling surface, skewing couples on the rollers must arise in the operating bearing, particularly due to the influence of the retaining flange, and cannot be prevented from having harmful effects unduly limiting the maximum speed and length of life of taper roller bearings.

The object of this invention is therefore, to provide constructions of taper roller bearings, in which the forces and couples acting on a roller in the operating bearing, instead of producing the above-described troubles, become useful, preventing the harmful effects such as skewing, oscillations of the rollers, and the like, from arising at higher speeds of rotation, and also causing a state of "true rolling" of the rollers on their tracks, thereby enabling taper roller bearings to be used for any required high speeds, as well as for heavy loads, for which present taper roller bearings cannot be used, and for great lengths of life.

My theory published in the "Journal of the Royal Aeronautical Society" gives the unified picture of the occurrences in taper roller bearings producing the troubles described above, in place of unrelated fragments of theory hitherto known, and shows the relations between the conditions causing the said troubles, and in this way also the relations between the conditions required to prevent the troubles. These, clothed in mathematical form, lead to a system of equations relating among themselves all the dimensions of taper roller bearings, and this leads to the constructional provisions of this invention, as described in the following, relating to complete taper roller bearings as well as to single taper rollers.

The present invention provides for a taper roller bearing comprising two bearing rings having substantially frusto-conical coaxial track-surfaces, a plurality of rollers each having a substantially frusto-conical, uninterrupted mantle-surface, said rollers being interposed with said mantle-surfaces between said tracks and being driven by one of said bearing rings, at least part of the mantle-surface of each roller coming into contact with the said track in said driving bearing ring and forming the effective frusto-conical rolling surface of said roller, and a flange on one of said bearing rings and adjacent the big ends of said rollers, each of said rollers having contact with a flange only at the big roller-end which is remote from the bearing axis, and each of said rollers having a mass-distribution relative to its effective rolling-surface which locates the centre of gravity of the roller between the narrow end-cross section of said effective rolling surface and the cross-section normal to the axis of the roller, which contains the centre of gravity of the total length of generatrix of the said roller mantle-surface, which comes into contact with the track in the said driving bearing ring.

For a bearing providing for an uninterrupted frusto-conical contact surface of each roller with its tracks, i. e. uninterrupted tracks, the centre of gravity of each roller must accordingly be situated between the narrow end-cross-section of the conical rolling-surface of each roller and the cross-section marking half the height of the said conical rolling-surface, which is in contrast to taper roller bearings as at present made, the rollers being generally solid of frusto-conical shape (as distinct from having a frusto-conical mantle-surface only), in which the centre of gravity is situated between the base-cross-section and the cross-section marking half the height of the conical contact-surface.

Figure 2:
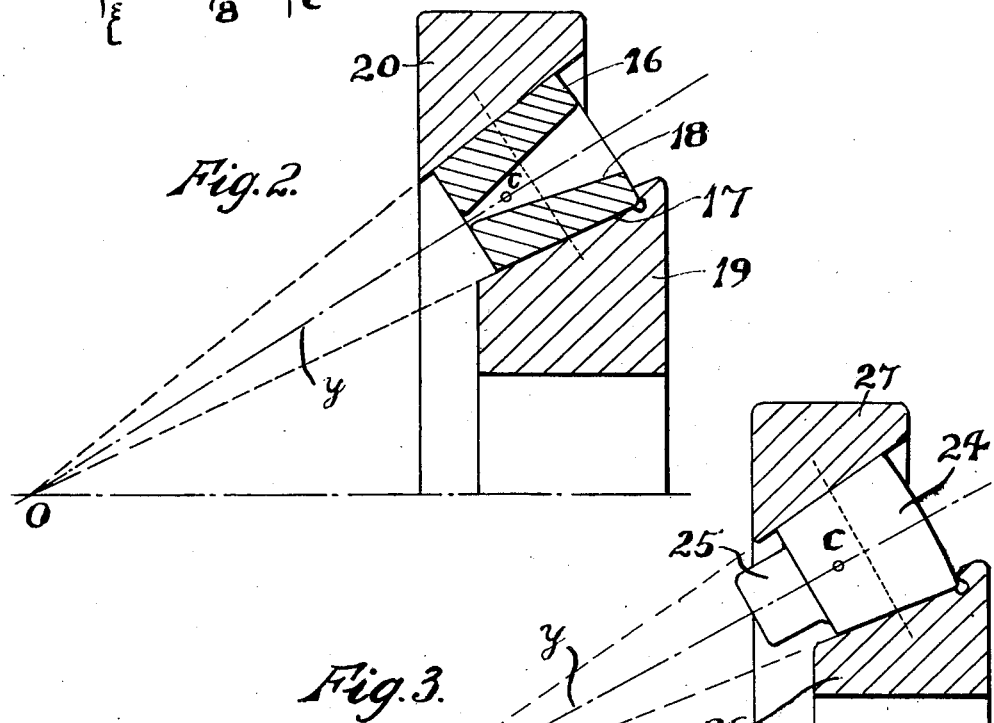
Figure 3:
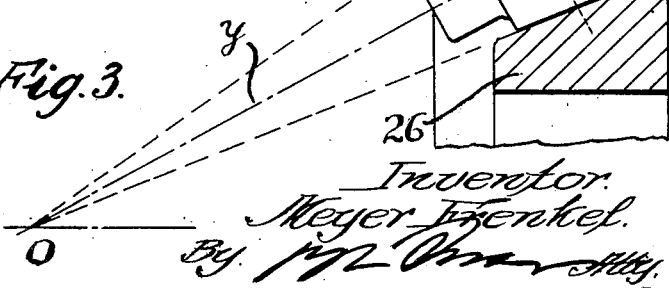
Figure 4:
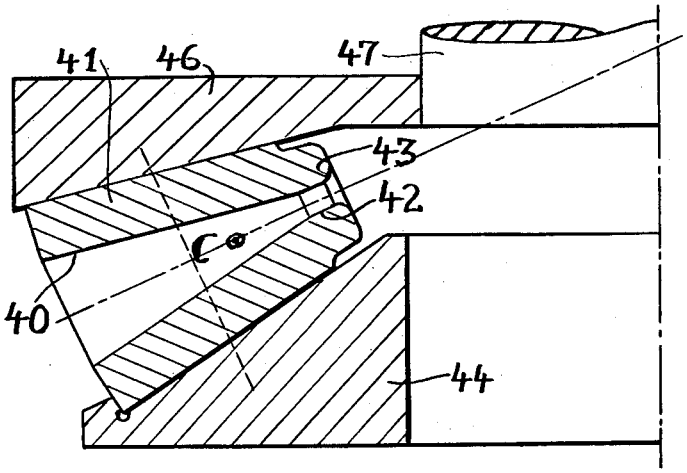
Figure 5:
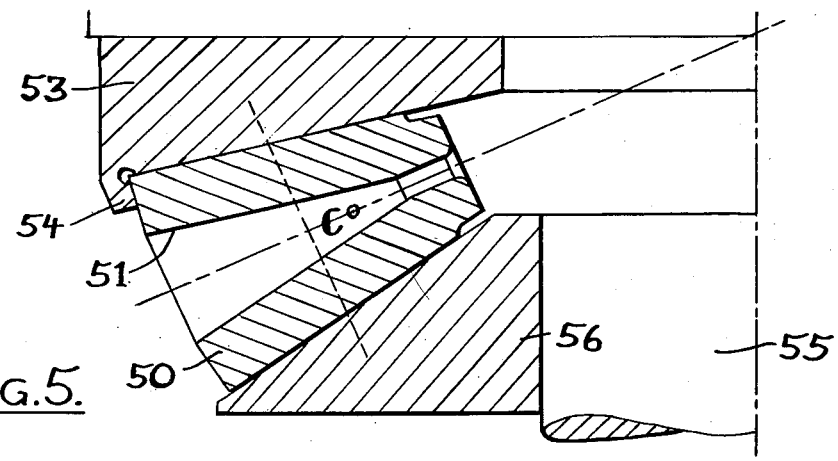
Figure 6:
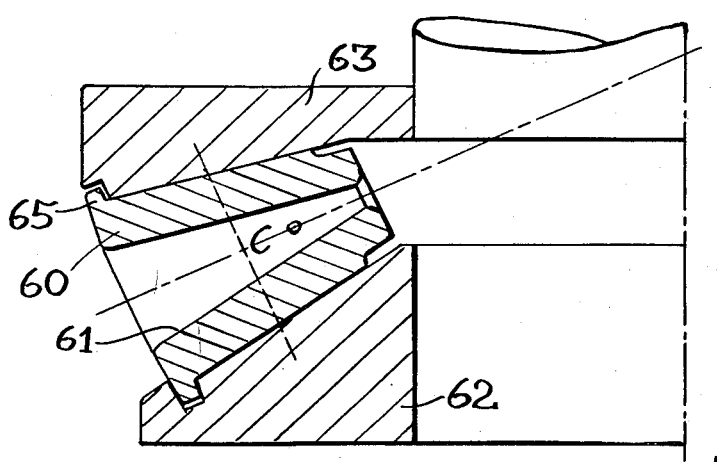

The invention will now be described by way of example and in detail, reference being had to the accompanying drawings, in which:

Fig. 1 shows diagrammatically a section through a taper roller bearing according to the invention, the drawing indicating several dimensions and symbols referred to in the detailed description of operation, Figs. 2 and 3 show diagrammatic sections of alternative embodiments of the invention, Fig. 4 shows a further example of an embodiment of the invention, possessing the feature of being self-cooling, Fig. 5 shows a further example of an embodiment of the invention, inverse to that shown in Fig. 4, the driving track being here the outside of a cone-surface, and Fig. 6 shows a further example of an embodiment of the invention, having flanged rollers.

Referring to Fig. 1, a roller 11 having a frustro-conical rolling-surface 9 is interposed between the coaxial conical rolling-tracks 7 and 8 of two bearing rings 12 and 14. Bearing ring 12 is fixed to rotating shaft 13 and thus is the driving ring of the bearing. The non-driving bearing ring 14 is provided with a flange 6 engaging the big roller-end 5, thus retaining the roller between the tracks. The roller 11 is formed with a central aperture 15, and has a part of its conical rolling surface 9 cut away at its narrow end, so that the centre of gravity of the roller, indicated at C becomes located between the cross-section normal to the geometric axis of the roller and marking half the height of the conical rolling-surface, and the narrow end-cross-section of the conical rolling surface. The distance at which the centre of gravity C of the roller is situated from the said cross-section containing the centre of gravity of the length of generatrix of the conical rolling-surface, which comes into contact with the driving track, towards the narrow end cross-section 4 of the conical rolling surface, is denoted by $L_{mc}$, and is expressed precisely as function of the dimensions of the bearing later in the specification. The various dimensions indicated on Fig. 1 are, apart from $L_{mc}$:

$H/2$, half the height of the frustro-conical rolling surface of the roller, measured from its base-cross-section, $r$ is the radius of the said base-cross-section, $\alpha_0$ is the half apex angle of said conical rolling surface 9, $\alpha_2$ is the angle between the geometric axis $y$ of roller 11 and the axis of the assembled bearing, OO, hereafter referred to as the pitch cone angle of the bearing, and $\xi$ is the normal distance from the generatrix of the conical rolling surface 9, which is in contact with the non-driving bearing ring, to the centre of gravity of the surface-area on the roller-end 5, which is enclosed between the outer circumference of said roller-end and the rim-line, adjacent said roller end, of the flange 6 on the non-driving bearing ring 14.

In the example of an assembled taper roller bearing shown in Fig. 2, the roller 16, whose external shape is frustro-conical with rolling surface 17 formed by its outside surface, is interposed between the tracks in the driving and non-driving bearing rings 20 and 19 respectively, the ring 19 having a flange engaging the outer end-surface of said roller. In compliance with the provisions of the invention, the roller has a cavity 18, which is symmetrical about the geometric axis $y$ of the roller, extending into it from its wider end cross-section, the said cavity being so shaped and dimensioned that the centre of gravity of the roller becomes located between the narrow (adjacent the bearing axis) end-cross-section of the conical rolling surface 17 and the cross-section marking half the height of the said conical rolling surface, its exact position being given by exact expression for $L_{mc}$ given later in the specification. This position of the centre of gravity can also be achieved by a cavity which does not extend right through the roller in the shape of an axial hole, as shown, but which merely extends into the roller from the external end-cross-section without penetrating right through. With an axial hole right through the roller, the hole being preferably in the shape of the frustrum of a cone as indicated at 18, such a bearing will act, during operation, like a centrifugal blower for air, cooling itself.

Fig. 3 shows another example of an embodiment of the invention, in which the roller 24, interposed between conical tracks 26 and 27, has projecting from the narrow end-cross-section of its frustro-conical rolling surface a cylindrical projection 25, symmetrical about the geometric axis $y$ of the roller, and having no contact with the race-tracks 26 and 27. The dimensions of projection 25 and of the conical rolling-surface of the roller 24 are such that the centre of gravity of this roller becomes located, in accordance with the provisions of the invention, between the narrow end-cross-section of the conical rolling-surface and that cross-section, which marks the half-height of the said rolling-surface. Ring 26 carries a flange engaging the outer end-surfaces of said rollers. In general, such projections from the narrow end-cross-section of the conical rolling-surface may have any shape symmetrical about the geometric axis $y$ of the roller, and may even be formed by a continuation of the roller itself with its frustro-conical outer shape, provided this does not come into contact with the race-tracks, so that the roller as a whole is of frustro-conical shape and the required position of the centre of gravity of the roller relative to the centre of gravity of the total length of generatrix of the conical rolling-surface, which comes into contact with the driving track, having been brought about by shortening the tracks in the bearing rings at the side adjacent the bearing axis by calculated amounts.

Similarly, the required position of the centre of gravity relative to the centre of gravity of the total length of generatrix of the rolling-surface, which contacts the track, can be brought about in accordance with the invention by providing a suitably dimensioned and positioned slot in one or both of the race-tracks.

Embodiments of the invention to produce the required position of the centre of gravity of the roller relative to the centre of gravity of the total lengths of generatrix of conical rolling-surface, which contact the driving track, may, according to this invention, be any combination of the embodiments described above.

In accordance with the invention, the rollers in a taper roller bearing may each consist of materials of different specific gravities, including spaces filled with liquids, such as oil under pressure; for example the material of smaller specific gravity would be used for the base-part of the rolling body, and the material of greater specific gravity for part of the roller near the narrow end of its conical rolling surface, so that the centre of gravity of the roller as a whole is situated between the cross-section marking half the height of the conical rolling surface and the narrow end cross-section of the conical rolling surface, as required according to this invention for an uninterrupted frustro-conical rolling surface coming into contact with the driving track.

In the example of an embodiment of the invention shown in Fig. 4, an axial hole 40, extending right through the roller about the geometric axis $y$ of the roller, is shown in a preferred shape, namely the shape of the frustum of a cone 40 extending into the roller 41 from its external end cross-section, merging into a cylindrical throat 42 and thence through radius 43 into the inner end cross-section of the roller, so that the axial hole altogether has the shape of a convergent-divergent nozzle. The hole will be so dimensioned, as will be the lengths of the conical contact surface of the roller, that the centre of gravity of the roller becomes located in the position required for trouble-free running of the bearing, while the convergent-divergent shape of the hole will ensure, that in operation the bearing acts like a centrifugal pump, blowing out air at the external end cross-section of each roller and producing a reduced pressure in the centre of the bearing. Through this provision, the bearing will air-cool itself, and can also assist in air-cooling other parts of the engine. In this embodiment, the non-driving track 44, carrying the roller retaining flange 45, which engages only the end-surface of said rollers, represents the outer surface of a cone, and the driving track 46, secured to the rotating shaft 47, represents the inner surface of a cone.

The embodiment shown in Fig. 5 is similar to the one shown in Fig. 4, but in this case the roller 50, provided with a central hole 51 right through, in the shape of a convergent-divergent nozzle, runs on a non-driving track 53, which is the inner surface of a cone. The non-driving bearing ring 53 again is provided with the retaining flange 54, which engages only the end-surface of said roller. The driving track 56 is secured to shaft 55 and represents the outer surface of a cone. The construction as a whole is seen to be an inverse of the construction shown in Fig. 4.

The embodiment shown in Fig. 6 is generally similar to that shown in Fig. 4, except that in this construction the roller 60, interposed between non-driving track 62 and driving track 63 secured to shaft 64, is formed with an annular flange 65 at its outer end which engages the flange 66 on the non-driving track 63, serving to retain the rollers between its tracks. The central hole 61 through the roller, of frustro-conical shape providing a convergent-divergent nozzle symmetrically disposed about the geometric axis of the roller, and the conical rolling-surface of the roller, are so dimensioned that the centre of gravity of the roller becomes located, in accordance with the invention, between the cross-section normal to the geometric axis of the roller, which contains the centre of gravity of the total length of generatrix of the rolling surface in contact with the driving track, and the narrow (adjacent the bearing axis) end cross-section of the said conical rolling surface, a distance $L_{mc}$ from the said first-defined cross-section of the roller, which will be given as function of the other dimensions of the bearing in the following.

It will be understood that the above descriptions are by way of example only, and that there are many other constructional examples falling within the scope of the provisions of this invention.

The effects of the afore-described provisions of this invention will be understood from the following short derivation of the "relations of the dimensions" of taper roller bearings which must be observed to obtain trouble-free running of taper roller bearing for any required speed and for long lengths of life.

Running of the rollers in a taper roller bearing without skewing of the rollers between their tracks means, that the geometric axis of each roller must lie in a plane which contains the centre of gravity of the roller in question and the axis OO of the assembled bearing, seen on Fig. 1. Such a plane containing the centre of gravity of the roller must have the angular velocity $\omega_c$ of the said centre of gravity about the bearing axis, and must accordingly, as proved, have the same angular velocity about any other axis contained in it and parallel to the bearing axis OO, that is, it must also have the angular velocity $\omega_c$ about the axis CC passing through the centre of gravity of the roller and parallel to the bearing axis OO. Hence, for no skewing of the roller to take place, the geometric axis of the roller, and thus the roller itself, must have the same angular velocity $\omega_c$ about the axis CC through its centre of gravity and parallel to bearing axis OO as this centre of gravity C has about axis OO.

When, on a change of the shaft-speed taking place, the angular velocity $\omega_c$ of the roller centre of gravity C about the bearing axis changes, with angular acceleration $$\frac{d\omega_c}{dt}$$

then for no skewing of the roller to occur, the angular velocity of the geometric axis of the roller, and thus of the roller itself, about axis CC, must experience an equal change, with angular acceleration $$\frac{d\omega_c}{dt}$$

in the same sense. For example, when an increase of shaft speed occurs, the resultant $P_r$ of the friction forces acting on the roller from the two rolling-tracks and the flange in the direction of motion of its centre of gravity (having velocity vector $V_c$) causes the acceleration of the said centre of gravity in its circular path according to $$P_r = M.R_c.\frac{d\omega_c}{dt}$$

M being the mass and $R_c$ the radius of the path of the roller centre of gravity, and further, the said force $P_r$, together with the dynamic reaction $$M.R_c\frac{d\omega_c}{dt}$$

acting at the centre of gravity of the roller forms a couple with arm $d$, $T_c = d.P_r$, which, in order that no skewing of the roller should occur, must give the roller the same angular acceleration $$\frac{d\omega_c}{dt}$$

about the axis CC, according to $$T_c = P_r.d = I_{cc}.\frac{d\omega_c}{dt}$$

where $I_{cc}$ is the moment of inertia of the roller about axis CC.

Accordingly, as will be seen from consideration of the sense of rotation of the required angular acceleration $$\frac{d\omega_c}{dt}$$

of the roller about CC, and of the direction of the couple due to the resultant $P_r$ of the friction forces and its dynamic reaction from the centre of gravity, which is to cause this angular acceleration, the axis CC passing through the roller centre of gravity and parallel to OO must be situated between the bearing axis OO and the line parallel to OO which passes through the point of action of the resultant $P_r$ of the friction forces parallel to the velocity vector $V_c$ of the roller centre of gravity.

If this condition is not observed, that is, the point of action of the resultant $P_r$ of the friction forces on the roller acting parallel to $V_c$ from both tracks and the retaining flange, falls between the roller centre of gravity and the bearing axis OO, the couple formed by $P_r$ and its dynamic reaction at the centre of gravity tends to angularly accelerate the roller about axis CC in the opposite direction to the required $$\frac{d\omega_c}{dt}$$

thereby always exerting a skewing couple leading to the harmful effects already described.

It is from this condition that derive the main constructional provisions of the present invention, requiring the centre of gravity of a roller to be situated between the bearing axis and the centre of gravity of the total length of generatrix of the conical rolling surface of the said roller, which comes into contact with the driving track.

In the same way, in order to prevent that at constant shaft speed, the friction force acting on the roller from the flange on the non-driving bearing ring, which always acts opposite to the direction of motion of the roller centre of gravity, should cause skewing or a retardation of the centre of gravity of the roller centre of gravity, the point of action of the resultant of the two friction forces from the tracks only (without the flange), which, as proved, always act in the same direction, must be situated between the point of action of the friction force from the flange (acting at the outer roller end) and the centre of gravity of the roller, whereby the couples formed by the different friction and other forces acting, each in a plane normal to the geometric axis of the roller, are enabled to balance, instead of reinforcing one another in their skewing effect. As is seen, this condition is likewise realised by the main provision of the present invention.

From the condition that, for no skewing of a roller to take place, the geometric axis of this roller must always be situated in a plane through the centre of gravity of this roller and the bearing axis, and must hence, as shown rotate with the same angular velocity $\omega_c$ about the axis CC through the centre of gravity and parallel to the bearing axis OO as the centre of gravity has about the bearing axis, the angular velocity of the roller about the axis $A_2C$ normal to the geometric axis of the roller (see Fig. 1) must equal $\omega_c \sin a_2$, $a_2$ being the pitch cone angle of the bearing. If, as indicated on Fig. 1, the resultant angular velocity vector $\omega$ of the roller in the plane containing its centre of gravity and the geometric axis, encloses an angle $\phi$ with the geometric axis of the roller, then for fulfillment of the above condition, $\omega . \sin \phi = \omega_c \sin a_2$ and, in connection with the condition for rolling of the roller on its non-driving track, which determines the rolling angular velocity $\omega \cos \phi$ of the roller about its geometric axis, one obtains the condition that the angle $\phi$ between the resultant angular velocity vector $\omega$ of the roller and its geometric axis must be $\phi = a_0$, the angle between the generatrix of the rolling-surface of the non-driving track and said geometric axis, or, in other words, the half apex angle of the conical rolling surface of the roller $a_0$.

From this condition and from my developments relating to the instantaneous axis of change of motion, as given in my published paper, one obtains the distance $L_{mc}$ along the geometric axis of the roller towards the bearing axis, which the centre of gravity of the roller must have from the plane normal to geometric axis, which contains the centre of gravity of the total length of generatrix of the conical rolling-surface, which comes into contact with the driving track, as function of the other dimensions of the bearing according to $$L_{mc} = \frac{1}{\tan a_0}\left[\frac{I \sin a_2}{M.R_c \sin a_0} - k.r_m\right]$$

where $I$ is the moment of inertia of the roller about an axis through its centre of gravity and enclosing an angle $a_0$ with the geometric axis of the roller, equal to the half apex angle $a_0$ of the conical rolling-surface, $R_c$ is the radius of the path of the centre of gravity of the roller about the bearing axis, $a_2$ is the pitch cone angle of the bearing, $r_m$ is the mean radius of its conical rolling surface, and $$k = \frac{I_1}{M.r_m^2}$$

with $I_1$ the moment of inertia of the roller about its geometric axis and M the mass of the roller.

The same distance $L_{mc}$ in terms of the dimensions of a roller only is $$L_{mc} = \left[\frac{2H(I_2 + Mr_m^2)}{Mr_m[2r_m \tan a_0(1-k) + H(1+k)]} - r_m\right]\tan a_0$$

where $I_2$ is the moment of inertia of the roller about an axis through its centre of gravity and normal to its geometric axis, and H is the height of the conical rolling surface of the roller (see Fig. 1).

Further conditions for the prevention of the troubles arising in taper roller bearings are derived from the following considerations:

For true rolling the angular velocity of the roller about an axis normal to the generatrix of the driving track in the plane containing the bearing axis and the centre of gravity of the roller, is $\omega . \sin 2a_0$, as will be realised with reference to Fig. 1, while the angular velocity of the roller about the axis through its centre of gravity and normal to the generatrix of the non-driving (fixed) track in the said plane of reference is instantaneously zero. Further, about an axis normal to the area of contact of the outer end-surface of the roller with the flange on the fixed track, the roller has an angular velocity, which is substantially equal to the resultant angular velocity $\omega$ of the roller, so that energy is lost by the roller at the flange due to the work being done by it there. The friction from the flange tends to cause skewing of the roller even at constant shaft-speed, which tendency is resisted by friction forces from both tracks. However, due to the roller having instantaneously no velocity about the axis through its centre of gravity and normal to the generatrix of the fixed track, the roller loses no energy at the fixed track, while due to the roller having angular velocity $\omega$. sin $2\alpha_0$ about the axis through its centre of gravity and normal to the generatrix of the driving track, energy is imparted to the roller by the friction forces acting from the driving track. In order that no skewing should actually occur, the energy imparted to the roller from the driving track must equal the energy lost by the roller at the flange on the fixed track, and this condition, clothed in mathematical form, provides the equation giving the distance $\xi$ from the generatrix of the track in the non-driving ring, in the plane containing the bearing axis and the centre of gravity of the roller, to the centre of gravity of the surface-area on the roller end which is enclosed between the outer circumference of said roller-end and the rim-line adjacent said roller-end of the flange on the said non-driving bearing ring, as function of the dimensions of the bearing:

$$\frac{l-4\xi}{\xi} = 4\left[\frac{2S}{1+k} - 2\tan\alpha_0\right]\frac{\sin(\alpha_2-\alpha_0)}{\sin 2\alpha_0 \sin\alpha_2}$$

where $$S = \frac{[I_2 + Mr_m^2(1+k)]\tan\alpha_0}{Mr_m\left(r_m\tan\alpha_0 + \frac{1+k}{2(1-k)}H\right)}$$

in which $l$ is the total length of generatrix of the the conical rolling surface of the roller, which comes into contact with the driving track, the other dimensions having already been defined. This is in connection with the condition that $$\frac{1-k}{1+k} + 2\tan\alpha_0 + \frac{(l-4\xi)\sin 2\alpha_0 \sin\alpha_2}{4\xi \sin(\alpha_2-\alpha_0)} \leq 1$$

The distance $\xi$ is further expressed as function of the dimensions of the bearing, including distance $L_{mc}$, by equation $$\frac{l-4\xi}{4\xi} =$$
$$\frac{\sin(\alpha_2-\alpha_0)}{\sin 2\alpha_0 \sin\alpha_2}\left[(L_{mc}+r_m\tan\alpha_0)\frac{2(1-k)}{H(1+k)} - 2\tan\alpha_0\right]$$

This is connected with the condition that $$[L_{mc}+r_m\tan\alpha_0]\frac{2(1-k)}{1+k} \geq \frac{H\sin\alpha_2\sin 2\alpha_0}{\sin(\alpha_2-\alpha_0)} + 2H\tan\alpha_0$$

Further, in connection with the requirement that the external loading on the bearing and the centrifugal force $C_f$ acting on a roller must produce the forces and couples giving the roller the motion required for trouble-free action of the bearing, that is, to give each roller a resultant angular velocity, the vector of which encloses an angle $\alpha_0$ with the geometric axis of the bearing roller, equal to the half apex angle $\alpha_0$ of the conical rolling surface of the roller, the moment of inertia $I_2$ of a roller about an axis through its centre of gravity and normal to its geometric axis, is determined as function of the external load on a bearing, represented by the normal pressure force $N$ between a roller and its tracks, and of the centrifugal force $C_f$ on a roller, and the dimensions of the bearing, according to $$I = \frac{Mr_m}{\tan\alpha_0}\left[S\frac{H}{1-k} + r_m\tan\alpha_0 \cdot S - \frac{H}{2}S - (1+k)r_m\tan\alpha_0\right]$$

$$S = \frac{1+k}{2}\left(2\tan\alpha_0 + \frac{C_f\sin\alpha_2}{N}\right)$$

From this and the previous expressions one obtains $L_{mc}$ as function of the forces and of the dimensions as $$L_{mc} = \frac{1+k}{2(1-k)}\left(2\tan\alpha_0 + \frac{C_f\sin\alpha_2}{N}\right)H - r_m\tan\alpha_0$$

It will be understood that taper roller bearings according to the present invention may have any suitable roller cage or roller separator.

I claim:

1. A taper roller bearing comprising two bearing rings having substantially frusto-conical, coaxial track-surfaces a plurality of rollers each having a substantially frusto-conical, uninterrupted mantle-surface, said rollers being interposed with said mantle-surfaces between said tracks and being driven by one of said bearing rings, at least part of the mantle-surface of each roller coming into contact with said track in said driving bearing ring and forming the effective rolling surface of said roller, and a flange adjacent the larger ends of said rollers on one of said bearing rings, each of said rollers having contact with a flange only at the larger roller-end which is remote from the bearing axis, and each of said rollers having a mass-distribution relative to its effective rolling-surface which locates the centre-of-gravity of the roller between the narrow end-cross-section of said effective rolling surface, which is adjacent the bearing axis, and the cross-section normal to the axis of the roller, which contains the centre of gravity of the total length of generatrix of the said roller mantle-surface, which comes into contact with the track of said driving bearing ring.

2. A taper roller bearing as claimed in claim 1, in which the distance $L_{mc}$ of the centre of gravity of a roller from the roller cross-section which contains the centre of gravity of the total length of generatrix of the said roller mantle-surface that comes into contact with the driving track, is determined as function of the dimensions of the bearing according to $$L_{mc} = \frac{1}{\tan\alpha_0}\left[\frac{I\sin\alpha_2}{M.R_c\sin\alpha_0} - k.r_m\right]$$

where: $M$ is the mass of the roller; $I$ is the moment of inertia of the roller about an axis through its centre of gravity and enclosing an angle $\alpha_0$ with the roller-axis, which is equal to the half-apex-angle $\alpha_0$ of the frusto-conical mantle surface; $R_c$ is the radius of the path of the roller centre-of-gravity about the bearing axis; $\alpha_2$ is the pitch cone angle of the bearing; $r_m$ is the mean radius of the effective frusto-conical rolling surface of a roller, and $$k = \frac{I_1}{Mr_m^2}$$

with $I_1$ being the moment of inertia of a roller about its geometric axis.

3. A taper roller bearing as claimed in claim 1, having its flange located on the non-driving bearing ring, each of said rollers having contact with a flange only at the roller-end remote from the bearing-axis, and having the normal distance $\xi$ from the generatrix of the track in said non-driving bearing ring, in the plane containing the bearing axis and the roller centre-of-gravity, to the centre of gravity of the surface-area on the roller-end, which is enclosed between the outer circumference of said roller-end and the rim-line adjacent said roller end of said flange on said non-driving bearing ring, determined as function of the dimensions of the bearing by the equation $$\frac{l-4\xi}{4\xi} = \frac{\sin(\alpha_2-\alpha_0)}{\sin 2\alpha_0 \sin \alpha_2}\left[(L_{mc}+r_m \tan \alpha_0)\frac{2(1-k)}{H(1+k)}-2\tan \alpha_0\right]$$

in which $L_{mc}$ is the distance along the roller-axis towards the bearing axis of the roller centre-of-gravity from the cross-section which marks the half-height of the effective frusto-conical rolling surface of said roller $$k = \frac{I_1}{M \cdot r_m^2}$$

with $I_1$ the moment of inertia of the roller about its bearing axis; M the mass of the roller, $r_m$ the mean radius of the frusto-conical rolling surface of the roller, H the height and $\alpha_0$ the half-apex-angle of said conical rolling surface, $l$ the total length of generatrix of said conical rolling-surface which comes into contact with the driving track and $\alpha_2$ the pitch-cone angle of the bearing.

4. A taper roller bearing as claimed in claim 1, in which the distance $L_{mc}$ along the roller-axis towards the bearing axis of the roller centre-of-gravity from the roller-cross-section which marks the half-height of the frusto-conical rolling surface of a roller is determined as function of the external load on the bearing and of the centrifugal force $C_f$ on a roller and of the dimensions of the bearing according to the equation $$L_{mc} = \frac{(1+k)H}{2(1-k)}\left(2\tan \alpha_0 + \frac{C_f \sin \alpha_2}{N}\right) - r_m \tan \alpha_0$$

where:

$$k = \frac{I_1}{M \cdot r_m^2}$$

with M the mass of the roller, $r_m$ the mean radius of its frusto-conical effective rolling surface and $I_1$ the moment of inertia about its geometric axis; H the height of the effective rolling surface and $\alpha_0$ the half apex angle thereof; $\alpha_2$ the pitch cone angle of the bearing and N the normal pressure force between a roller and its tracks.

5. A tapered bearing roller having a substantially frusto-conical, uninterrupted rolling surface and having an axial hole through the roller in the shape of the frustum of a cone with its base in the big end cross-section of the roller and its small end cross-section in the small end cross-section of the roller which locates the centre of gravity of said roller at a distance towards the small end from the cross-section marking half the height of said frusto-conical rolling surface.

6. A tapered bearing roller having a substantially frusto-conical, uninterrupted rolling surface and having an axial hole through itself in the shape of a convergent-divergent nozzle with its throat adjacent the small end cross-section of said frusto-conical rolling surface, which locates the centre of gravity of said roller at a distance towards the small end from the cross-section marking half the height of said frusto-conical rolling surface.

7. A taper roller bearing comprising two bearing rings having substantially frusto-conical, coaxial track surfaces, a plurality of rollers each having a substantially frusto-conical, uninterrupted mantle-surface, said rollers being interposed with said mantle-surfaces between said tracks and being driven by one of said bearing rings, at least part of the mantle-surface of each roller coming into contact with said track in said driving bearing ring and forming the effective frusto-conical rolling surface of said roller, and a flange adjacent the larger ends of said rollers on one of said bearing rings, each roller having contact with a flange only at the larger roller-end which is remote from the bearing axis, and each roller having a projection from the narrow end-cross-section of its effective frusto-conical rolling surface, the said projection being symmetrically shaped about the geometric axis of the roller and being out of contact with the bearing rings, and of such dimensions that the centre of gravity of said roller is located at a distance towards the small end from the cross-section containing the centre of gravity of the generatrix of said frusto-conical effective rolling surface.

8. A taper roller bearing comprising two bearing rings having substantially frusto-conical, coaxial track-surfaces, a plurality of rollers each having a substantially frusto-conical, uninterrupted mantle-surface, said rollers being interposed with said mantle-surfaces between said tracks and being driven by one of said bearing rings, at least part of the mantle-surface of each roller coming into contact with said track in said driving bearing ring and forming the effective frusto-conical roller surface of said roller, and a flange, each roller having contact with a flange only at the big roller-end which is remote from the bearing axis, each roller having a projection from the narrow end cross-section of its effective frusto-conical rolling surface which is adjacent the bearing axis, said projection being symmetrically shaped about the geometric axis of the roller and being out of contact with the bearing rings, and each roller having an axial hole through itself in the shape of a convergent-divergent nozzle with its throat adjacent the small end-cross-section of the effective rolling surface thereof, this mass-distribution of the roller relative to its effective rolling surface being such that the centre of gravity of the roller is located at a distance towards said small end-cross-section from the cross-section containing the centre-of-gravity of the total length of generatrix of said roller mantle-surface, which forms said effective rolling surface of the roller.

9. A taper roller bearing as claimed in claim 1, each roller comprising a flange at its big end which is remote from the bearing axis, for engaging said flange on one of said bearing rings.

10. A taper roller bearing as claimed in claim 1, in which a roller has at least part of its big end made of a material which is of smaller specific gravity than the material of which the small roller-end is, at least in part, made up.

11. A taper roller bearing comprising two bearing rings having substantially frusto-conical, coaxial track-surfaces, a plurality of rollers each having a substantially frusto-conical, uninterrupted mantle-surface, said rollers being interposed with said mantle-surfaces between said tracks and being driven by one of said bearing rings, at least part of the mantle-surface of each roller coming into contact with said track in said driving bearing ring and forming the effective rolling surface of said roller, and a flange adjacent the larger ends of said rollers on one of said bearing rings, each of said rollers having contact with a flange only at the larger end which is remote from the bearing-axis, and each of said rollers having an axial hole extending through it and such a mass-distribution relative to its effective rolling-surface, which locates the centre-of-gravity of the roller between the narrow end-cross-section of said effective rolling-surface which is adjacent the bearing axis, and the cross-section normal to the axis of the roller, which contains the centre-of-gravity of the total length of generatrix of the said roller mantle-surface, which comes into contact with the track of said driving bearing ring.

MEYER FRENKEL.

REFERENCES CITED

The following references are of record in the file of this patent:

UNITED STATES PATENTS

| Number | Name | Date |
|---|---|---|
| Re. 15,345 | Robson | Apr. 25, 1922 |
| 921,656 | Alden | May 18, 1909 |
| 1,397,142 | Palmgren | Nov. 15, 1921 |
| 1,542,300 | Huther | June 16, 1925 |
| 2,215,701 | Henselman | Sept. 24, 1940 |
| 2,231,351 | Ringle | Feb. 11, 1941 |